United States Patent
Dostal

[15] 3,666,974
[45] May 30, 1972

[54] TORSIONAL FORK TRANSDUCERS

[72] Inventor: Frank Dostal, Elmhurst, N.Y.

[73] Assignee: Bulova Watch Company, Inc., New York, N.Y.

[22] Filed: Jan. 16, 1970

[21] Appl. No.: 3,349

[52] U.S. Cl. .............................310/8.2, 58/23 TF, 310/8.7, 310/25, 310/36, 318/132, 350/6
[51] Int. Cl. .........................................................H01v 7/00
[58] Field of Search.........................310/8, 8.1, 8.2, 8.3, 8.7, 310/25, 36, 22; 58/23 TF; 350/6, 285; 331/156; 34/409, 457; 318/132

[56] References Cited

UNITED STATES PATENTS

| | | | |
|---|---|---|---|
| 2,880,333 | 3/1959 | Dranetz | 310/8.2 |
| 2,978,597 | 4/1961 | Harris | 310/8.2 X |
| 3,431,808 | 3/1969 | Oudet et al | 310/36 UX |
| 3,307,055 | 2/1967 | Schafft | 310/8.3 X |

Primary Examiner—Milton O. Hirshfield
Assistant Examiner—B. A. Reynolds
Attorney—Michael Ebert

[57] ABSTRACT

A torsional fork transducer wherein the two lines of the fork are interconnected at their feet by a piezoelectric crystal operating in the longitudinal mode, the crystal being energized at a rate determined by the natural frequency of the fork to effect torsional vibration of the tines. Oscillators derived from a pick-up electrode on the crystal are applied to the input of an electronic amplifier whose output is fed to a drive electrode on the crystal to sustain the fork in vibration.

8 Claims, 7 Drawing Figures

Patented May 30, 1972 3,666,974
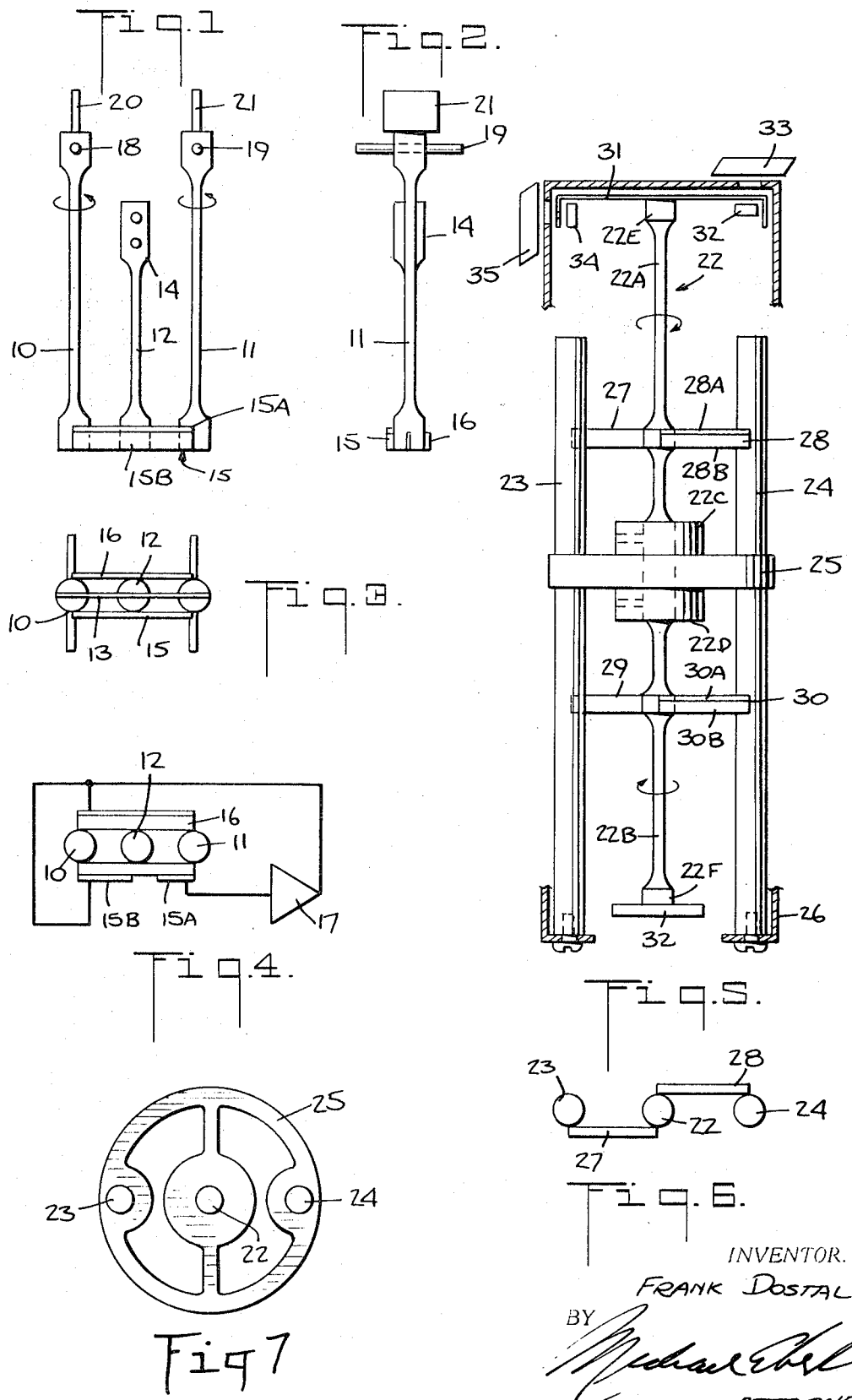

TORSIONAL FORK TRANSDUCERS

BACKGROUND OF THE INVENTION

This invention relates generally to torsional oscillators, and in particular to an oscillator of this type which is exceptionally efficient and compact, and is adapted to provide a vibratory action of high amplitudes at a constant rate.

Various forms of optical devices are currently in use to chop, modulate, pulse, scan, sweep or otherwise control a light beam or other beams of radiant energy. Such devices are incorporated in mass spectrometers, bolometers, star trackers, colorimeters, horizon sensors and in various instruments which utilize or analyze ion, nuclear, X-ray, laser beams or beams in the visible, ultra-violet or infrared region.

Existing optical devices for this purpose usually make use of motor-driven discs, drums, mirrors or prisms. Devices using motors are relatively big and heavy and have large power requirements, particularly at higher frequencies, thus necessitating extra size and weight provisions for inverters or similar power supplies. Also in use are electromechanically-actuated armature devices in which the pivoted armature is mounted in jeweled bearings. Optical modulators of these types are relatively inefficient and unstable, they are lacking in shock resistance and have other drawbacks which limit their usefulness.

In my co-pending applications Ser. Nos. 730,425 filed May 20, 1968, now U.S. Pat. No. 3,532,408, and 814,649 filed Apr. 9, 1969, respectively, there is disclosed a torsional oscillator in which an erect torsion rod, anchored at the base, is electromagnetically driven to a point adjacent the base to cause an optical element attached to the free end of the rod to swing back and forth with an amplitude proportional to the height and Q of the rod.

SUMMARY OF INVENTION

It is the primary object of this invention to provide a high "Q" torsional fork oscillator, which is exceptionally compact, efficient, and light weight, and which produces a vibratory action of high amplitude at a constant rate determined by the resonance characteristics of the oscillator.

More specifically, it is an object of the invention to provide a torsional fork oscillator which is sustained in vibration by piezoelectric crystals functioning in the longitudinal mode.

An oscillator in accordance with the invention is adapted to activate optical devices such as scanners and choppers and for vibrating electrostatic probes wherein an electrode is alternately exposed to and cut off from an electrostatic field at a periodic rate.

A significant aspect of the invention is that the torsional fork oscillator is relatively insensitive to shock forces which may arise in hostile environments, the oscillator having a prolonged operating life, there being no need for lubrication or other care. Operating wear is almost non-existent and reliability is of a high order. While the invention will be described in conjunction with an optical scanner, it is to be understood that it is also useful in any application calling for a vibratory action at a constant rate.

Briefly stated, in a preferred embodiment of the invention, there is provided a torsional fork having a pair of oscillating tines, whose feet are interconnected by a piezoelectric crystal operating in the longitudinal mode, the crystal being energized at a rate determined by the natural frequency of the fork to effect torsional movement of the tines, oscillations derived from a pick-up electrode on the crystal being applied to the input of an amplifier whose output is coupled to a drive electrode on the crystal to sustain the torsional fork in vibration.

OUTLINE OF DRAWING

For a better understanding of the invention as well as other objects and features thereof, reference is made to the following detailed description to be read in conjunction with the drawing, wherein:

FIG. 1 is a front elevation of one preferred embodiment of a torsional fork oscillator in accordance with the invention;

FIG. 2 is a side view of the oscillator;

FIG. 3 is a plan view of the oscillator looking at the base thereof;

FIG. 4 is a block diagram of the circuit associated with the oscillator;

FIG. 5 is an elevational view of another preferred embodiment of a torsional oscillator in accordance with the invention;

FIG. 6 illustrates the relationship between the torsional element and the piezoelectric crystals associated therewith; and FIG. 7, in plan view, shows the compliance member for supporting the torsional element.

DETAILED DESCRIPTION OF INVENTION

Referring now to the drawings, and more particularly to FIGS. 1 and 3, a torsional fork transducer in accordance with the invention comprises a pair of parallel torsional bars 10 and 11, a supporting bar 12 being interposed between the torsional bars. A strip 13 of flat spring metal is arranged to interconnect the feet of bars 10, 11 and 12 to hold these bars together. Supporting bar 12 is provided with a stud 14 for attaching the torsional fork oscillator to a suitable mount.

The basic principles underlying the operation of a torsional fork are set forth in my prior U.S. Pat. No. 2,877,365 (1959) which shows a tuning fork whose tines are caused to vibrate torsionally substantially along the longitudinal axes of the tines, rather than laterally as in a conventional fork. In the torsional fork shown in this patent, the tines are sustained in vibration by an electromagnetic actuator.

In a tuning fork of traditional design in which the tines vibrate laterally, the restoring force, resulting from the elastic nature of the tines, acts in the transverse direction with respect to the longitudinal axes of the fork. Hence, when the fork is held with its tines vertically downward, the restoring force is augmented by the force of gravity, making the fork rate faster. But when the fork is held with its tines vertically upward, the restoring force is decreased by the gravity factor, causing the fork rate to slow down. The effect of acceleration on a conventional fork is to multiply the rate error by the number of times acceleration exceeds gravity. Thus a standard fork is sensitive both to attitude and acceleration.

With a torsional fork, since the torsional vibration takes place about the longitudinal axes of the tines, the restoring force is independent of gravity and acceleration and the fork frequency is free of errors arising from these factors.

However, while a torsional fork of the type disclosed in my prior patent has distinct advantages over a conventional fork, the electromagnetic actuator disclosed in said patent, which requires the use of cross pieces at the ends of the tines as well as magnets and coils, makes it difficult to produce a highly compact torsional fork transducer to operate optical and other devices, in a very restricted space.

In accordance with the present invention, the torsional fork is driven by a piezoelectric system using crystals of the type which increase or decrease in length, depending on the potential and the polarity of the voltage applied thereto. Thus, a given crystal will become longer for a given polarity and will shorten in length when the polarity is reversed. The crystal material may be of quartz or ceramic material including barium titanate, lead zirconate, titanate or other substance possessing piezoelectric properties and working in the longitudinal mode.

In FIG. 1, two strip-shaped crystals 15 and 16 are used, each crystal being provided with suitable electrodes for applying a voltage thereto to effect a dimensional change or for deriving a voltage therefrom in response to a dimensional change. Crystal 15 is attached at its ends tangentially to torsional bars 10 and 11 on one side thereof, the midpoint of the crystal being attached to supporting bar 12. Crystal 16 is similarly attached to torsional bars 10 and 11 and supporting bar 12, but on the other side thereof. Thus, the bars are flanked at their feet by piezoelectric crystal strips.

Crystal 15 is provided with a narrow electrode 15A running the length of each strip to provide a pick-up signal and a broader electrode 15B, which is in parallel to electrode 15A but is electrically separated therefrom for applying a driving signal to the crystal. Crystal 16 is provided with an electrode 16A used only for driving purposes.

As shown schematically in FIG. 4, the pick-up electrode 15A of crystal 15 is coupled to the input of an electronic amplifier 17 whose output is coupled to drive electrode 15B as well as to drive electrode 16A. In practice, the amplifier may be a one- or two-stage solid-state amplifier. The fork is sustained in vibration at its natural frequency by amplifying the pick-up voltage and applying it to the drive crystals in a positive feedback loop.

Crystals 15 and 16 are oppositely polarized so that as crystal 16 expands in length, crystal 15 will concurrently contract, causing the two torsional bars 10 and 11, tangentially attached thereto, to move angularly about their longitudinal axes in opposite directions. Attached to the free end of bar 10, as best seen in FIGS. 1 and 2, is a cross rod 18, while attached to the free end of bar 11 is a similar cross rod 19. The moment of rods 18 and 19 and the elasticity of the torsional bars are factors which determine the vibrating frequency of the torsional fork.

Attached to the free ends of torsional bars 10 and 11 are vanes or optical elements 20 and 21, respectively. In order to obtain a large swing of these elements, it is essential that the torsional swing at the free ends of the rods be large. Because the torque is applied by the crystals at the feet of the rods, mechanical amplification takes place, and it becomes possible to produce a considerable torsional swing at the free ends which is well over a hundred times that at the feet. Hence, the minute changes in dimension of the crystals is sufficient to effect the necessary swing at the free ends of the rods.

Support rod 12 acts as a compliance member which provides coupling between torsion bars 10 and 11 and also serves to an extent to absorb slight imperfections in the tuning of the torsion rods.

Since the assembly strip 13 is also a frequency-determining element, it can be chosen to provide a degree of frequency temperature compensation for the system. For example, if the material of the torsion rods 10 and 11 has a negative elastic coefficient, then assembly strip 13 can be made of a material having a positive elastic coefficient to provide compensation.

In the embodiment shown in FIGS. 5, 6 and 7, a large vane motion is achieved within a housing of small diameter. In order to reduce the diameter of the torsional transducer, instead of a pair of parallel torsion tines, a single torsional rod is used, so supported at its center by a compliant mount that the two sections of the rod on either side of the mount operate in opposing phase, so that the rod behaves as a straightened-out torsional fork. While this construction results in a transducer which is longer than that shown in FIG. 1, it is advantageous where the desideratum is a casing of small diameter rather than one which is short in length.

This device is useful in providing a light-weight, small and efficient unit which is suitable for optical devices such as scanners and choppers and for electrostatic probes wherein an electrode is alternatively exposed to and cut off from an electrostatic field.

The device comprises a torsional shaft 22, supported at its center between frame members 23 and 24 by a mechanical compliance 25 of circular shape and made of springy material, thereby effectively dividing shaft 22 into an upper rod section 22A and a lower rod section 22B. A housing 26, attached to frame members 23 and 24, affords protection and shielding. Compliance 25 supports sections 22A and 22B at a nodal point to effect the highest mechanical coupling between the two oppositely vibrating torsional sections, while reducing the coupling between the sections and the supporting frame structure. Thus, little vibration is transmitted to the frame, thereby sustaining the efficiency of the system.

Crystals 27 and 28 are attached tangentially between upper torsional section 22A and frame elements 23 and 24, respectively. Crystals 29 and 30 are similarly attached tangentially to lower rod section 22B. The crystals are similar to those shown in FIG. 3 and operate in the longitudinal mode. Electrodes 28A and 30A on crystals 28 and 30 provide a pick-up voltage for the input of an amplifier (not shown) whose output is coupled to drive electrodes 28B and 30B on crystals 28 and 30 and to an electrode on drive crystals 27 and 29, so that the torsional sections are sustained in vibration. The crystals are connected together in multiple and in the correct phase.

Rod sections 22A and 22B in their portions 22C and 22D adjacent compliant mount 25 are of enlarged diameter to provide amplitude magnification and impedance transformation. The motion developed at the point on the rod sections 22A and 22B where the crystals are attached is magnified along the length of the sections both by impedance transformation and by the mechanical Q of the rod. Magnification in the order to 50 to 100 times is feasible.

The diameters of the sections 22A and 22B are also enlarged at the free end portions 22E and 22F to provide an adequate surface to mount the devices to be vibrated. In the embodiment shown, a vane 31 is attached to the free end of rod section 22A. A counterweight 32 to balance the torsional system is attached to the free end of rod section 22B.

The torsional movement of vane 31 acts to bring about alternate exposure and blockage of electrode 32 with respect to the electrostatic field created by plate 33 through an opening in the vane. Similarly, electrode 34 is alternately exposed and cut off with respect to an electrostatic field charge on plate 35 through an opening in the vane. These vane openings and electrodes afford end- and side-looking electrostatic probes. The voltages induced in electrodes 32 and 34 are alternating in character and, when suitably amplified, provide an indication of the potential on surfaces 33 and 35.

Similarly, if light detectors are substituted for the electrodes, and light sources for the electrostatic charge surfaces, a periodic light signal is generated by the vibrating vane. If a mirror is attached to the free end of rod section 22A, a light scanner is created thereby.

The advantage of this system of oppositely vibrating masses is that the reactive forces are self-opposing so that the amplitude of vibration is unaffected by the manner in which the unit is held, ranging from a floating system in a no-G environment to a hard mount, to a large moment. Nevertheless, in practice, one may simplify the torsional transducer structure by doing away with the lower section of rod and its associated crystals, and replacing the compliance with a hard mount, while adding adequate moment to the housing. If the moment of the housing is made several thousand times the moment of the vane or mirror being vibrated, a satisfactory operation is obtainable. This is analagous to the ratio of the moment of a watch movement to the moment of its balance wheel.

While there have been shown preferred embodiments of the invention, it is to be understood that many changes and modifications may be made therein without department from the essential spirit of the invention.

What I claim is:

1. A torsional transducer comprising
   a. a torsional rod, and
   b. means to sustain said rod in vibration at its natural frequency, said means including a piezoelectric crystal operating in the longitudinal mode, one end of said crystal being tangentially attached to said rod, the other end being attached to a fixed support, said crystal having a drive electrode and a pick-up electrode, said pick-up electrode being coupled to the input of an electronic amplifier whose output is coupled to said drive electrode to provide a positive feedback loop.

2. A torsional fork transducer comprising
   a. a pair of torsional tines in parallel relation, a supporting rod at an intermediate position between said tines and a strip interconnecting said tines and said rod at the feet thereof, b. means attaching said rod to a fixed mount, c. and means to sustain said tines in torsional vibration, said means including a piezoelectric crystal operating in the longitudinal mode, the ends of said crystal being tangentially attached to said tines on one side at the feet thereof, said crystal having a drive electrode and a pick-up electrode, said pick-up electrode being coupled to the input of an electronic amplifier whose output is coupled to said drive electrode to provide a positive feedback loop.

3. A transducer as set forth in claim 2, wherein said strip is of resilient material.

4. A transducer as set forth in claim 3, wherein said strip has a predetermined temperature coefficient which is adapted to effect frequency compensation with respect to the temperature coefficient of said tines.

5. A transducer as set forth in claim 2, further including a second crystal attached tangentially to the feet of said tines on the opposite side thereof, said second crystal having a drive electrode coupled to the output of said amplifier, said second crystal operating in the longitudinal mode in phase opposition to the first crystal.

6. A transducer as set forth in claim 2, further including optical elements secured to the free ends of the tines.

7. A transducer as set forth in claim 2, further including cross pieces attached to the free ends of the tines.

8. A torsional fork transducer comprising a. an elongated shaft supported at its center by a compliant mount, the upper section of the shaft constituting a first torsional rod and the lower section a second torsional rod vibrating in phase opposition to the first rod, b. a pair of frame elements disposed on either side of the shaft and attached to said mount, and c. means to sustain said first and second rods in torsional vibration, said means including a crystal operating in the longitudinal mode and attached at its ends between a rod section and one of said frame elements, said crystal having a drive electrode and a pick-up electrode, said pick-up electrode being coupled to the input of an electronic amplifier whose output is coupled to said drive electrode.

* * * * *